(12) United States Patent
Kennedy

(10) Patent No.: US 7,410,044 B2
(45) Date of Patent: Aug. 12, 2008

(54) ARTICLE CARRIER FOR A GRADING APPARATUS

(75) Inventor: Hamish Alexander Nigel Kennedy, Auckland (NZ)

(73) Assignee: Anzpac Systems Limited, Onehunga, Auckland (NZ)

( * ) Notice: Subject to any disclaimer, the term of this patent is extended or adjusted under 35 U.S.C. 154(b) by 235 days.

(21) Appl. No.: 10/543,478

(22) PCT Filed: Jan. 30, 2004

(86) PCT No.: PCT/NZ2004/000016

§ 371 (c)(1), (2), (4) Date: Jul. 26, 2005

(87) PCT Pub. No.: WO2004/067417

PCT Pub. Date: Aug. 12, 2004

(65) Prior Publication Data

US 2006/0151289 A1 Jul. 13, 2006

(30) Foreign Application Priority Data

Jan. 31, 2003 (NZ) .................................... 523931

(51) Int. Cl.
*B65G 47/10* (2006.01)
(52) U.S. Cl. .............................................. 198/370.04
(58) Field of Classification Search ............ 198/370.04, 198/385, 386, 387; 209/592, 912
See application file for complete search history.

(56) References Cited

U.S. PATENT DOCUMENTS

| 4,262,807 | A |   | 4/1981 | Leverett |           |
|-----------|---|---|--------|----------|-----------|
| 4,569,434 | A |   | 2/1986 | Horii et al. |       |
| 5,230,394 | A |   | 7/1993 | Blanc    |           |
| 5,244,074 | A | * | 9/1993 | Riemrich | 198/370.04 |
| 5,294,004 | A | * | 3/1994 | Leverett | 198/370.04 |
| 5,348,132 | A |   | 9/1994 | Maier    |           |
| 5,433,311 | A | * | 7/1995 | Bonnet   | 198/370.04 |
| 5,730,273 | A | * | 3/1998 | Boller   | 198/370.04 |
| 5,857,555 | A | * | 1/1999 | Maier et al. | 198/370.04 |

(Continued)

FOREIGN PATENT DOCUMENTS

AU        701354        3/1998

(Continued)

*Primary Examiner*—James R Bidwell
(74) *Attorney, Agent, or Firm*—Kilpatrick Stockton LLP

(57) ABSTRACT

An article carrier (1) includes a mount (3) for mounting the article carrier to a conveyor. A carrier frame (4) is located over the mount and is movable about a pivot (5) so as to be locatable in a carriage position, in which articles (2) may be supported on the carrier frame (4), and an ejection position, in which articles (2) are ejected from the carrier frame (4). The apparatus further includes a locking member (6); wherein when the carrier frame (4) is located in the carriage position, the locking member (6) is locatable in a first position that prevents movement of the carrier frame (4) about the pivot (5) and is movable into a second position that releases the carrier frame (4), allowing the carrier frame (4) to move about the pivot. When the locking member (6) is located in the first position to prevent movement of the carrier frame, the locking member is not under load. The article carrier (1) may be used as part of a grading apparatus.

55 Claims, 6 Drawing Sheets

U.S. PATENT DOCUMENTS 6,092,640 A * 7/2000 Kennedy et al. ....... 198/370.04
2003/0183482 A1 * 10/2003 Boller et al. ........... 198/370.04

FOREIGN PATENT DOCUMENTS

| EP | 0 568 763 B1 | 6/1996 |
| WO | WO 93/07972 A1 | 4/1993 |
| WO | WO 94/14547 A1 | 7/1994 |
| WO | WO 96/25447 A1 | 8/1996 |

* cited by examiner 3A  3B 4A 4B

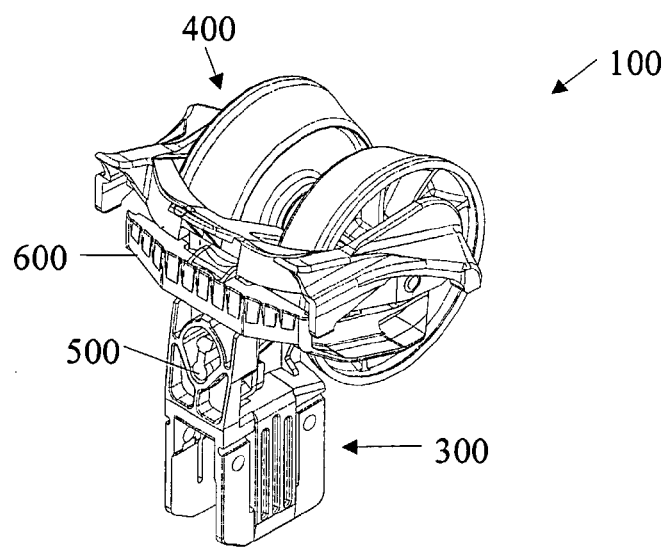
Figure 7
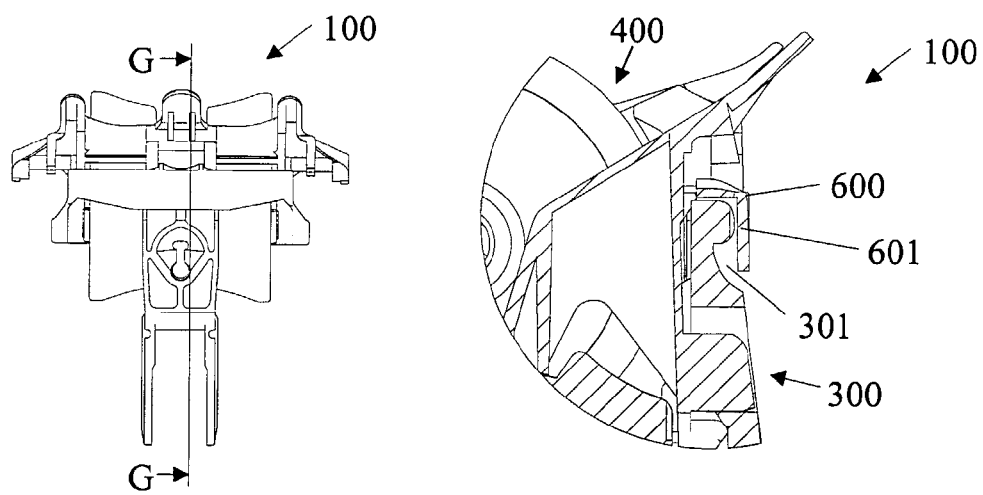
Figure 8
Figure 9

ARTICLE CARRIER FOR A GRADING APPARATUS

CROSS REFERENCE TO RELATED APPLICATIONS

This application is the U.S. National Phase of PCT/NZ2004/000016 filed on 30 Jan. 2004 which claims priority to New Zealand Patent Application No. 523931 filed on 31 Jan. 2003, the contents of which are incorporated by reference herein.

TECHNICAL FIELD

The present invention relates to article carriers for use in a grading apparatus and in particular, but not exclusively to carriers used as part of a grading apparatus for articles such as fruit.

BACKGROUND

Article carriers are often used in fruit graders to transport fruit through various measurement stages for grading purposes and to eject fruit at a required location dependent on the result of the grading process. Such article carriers usually include an endless circuit of carriers or cups on a conveyor chain with the cups situated to unload fruit at one of a plurality of stations.

U.S. Pat. No. 5,348,132 (Maier) describes a carriage for goods that is provided with a tilting device that is fastened to a carriage frame and is equipped with a push rod which is used to tilt a transporting tray disposed on a horizontal shaft. The tray can be tilted in either direction. The carriage includes a large number of components and the push rod necessarily travels with the carriage, increasing the complexity and cost of the carriage.

U.S. Pat. No. 4,262,807 (Leverett) describes a cup that is freely pivotable at one end about a tow bar. The cup is supported in a horizontal position by a pin that rides on an upper camming surface that includes drop spaces. Bridge struts allow the cup to ride over the drop spaces. The cup can only discharge articles in one direction.

U.S. Pat. No. 5,230,394 (Blanc) describes a two roller carriage that can tilt in one direction. The carriages include a lug that slide on a cam, causing lateral tilting of the carriage for article discharge.

The article carrier described in international publication no. WO 94/14547 (Horticultural Automation Limited) allows unloading to both sides of a conveyor, allowing increased unloading points for a given length of conveyor over a carrier that ejects to one side only. The contents of the carriers are also substantially shifted sideways rather than being "kicked" or dropped, which may result in improvements in fruit quality.

While carriers of the type described in WO 94/14547 have been successfully used for article carriage and ejection, some inaccuracies have been found to occur, which increase the reject volumes and product recycling. Furthermore, particular fruit sizes and shapes can introduce instability to the carrier. In particular if large misshapen fruit is carried by the carrier in a position that creates an off-centre load, it is possible that the opposite side of the carrier to the centre of gravity of the load may be lifted, resulting in some lateral movement of the carrier in the direction of the off-centre load, which increases the instability and may result in spontaneous tipping of the carrier.

It is therefore an object of the invention to provide an article carrier that has advantages over article carriers at present, or at least to provide the public with a useful alternative.

Any reference in this specification to the prior art does not constitute an admission that such prior art is widely known or forms part of the common general knowledge.

SUMMARY OF THE INVENTION

According to a first aspect of the present invention, there is provided an article carrier including means for mounting the article carrier to a conveyor, a carrier frame located over said means for mounting the article carrier to a conveyor and freely movable about a pivot so as to be locatable in a carriage position, in which articles may be supported on the carrier frame, and an ejection position, in which articles are ejected from the carrier frame, and a locking member, wherein when the carrier frame is located in the carriage position, the locking member is locatable in a first position that prevents movement of the carrier frame about said pivot and is movable vertically into a second position that releases the carrier frame, allowing the carrier frame to move about the pivot.

Preferably, the carrier frame may be shaped and positioned relative to the means for mounting the article carrier to a conveyor so as to hold articles located thereon substantially centred vertically of the pivot when the carrier frame is in the carriage position. Preferably, when an article is located on said carrier frame, substantially no weight of the article is borne by the locking member.

Preferably, the locking member may be secured to the carrier frame so as to move with the carrier frame about the pivot and includes a portion that extends to both sides of the pivot, whereby at least after the completion of vertical movement of the locking member from the first position to the second position, motive force applied to the locking member in the direction of the second position acts to cause the carrier frame to move about the pivot.

Preferably, the carrier frame may be movable from the carriage position in either direction about said pivot so as to be operable to eject articles located thereon to either side of the article carrier.

In one embodiment, the carrier frame may be adapted to hold articles thereon so as to be centred in a plane horizontally offset of the pivot when the carrier frame is in the carriage position and wherein the carrier frame can pivot about said pivot in the direction of said article when the locking member is in the second position.

Preferably, the carrier frame may be dissociable from the means for mounting the article carrier to a conveyor the pivot by disassembling said pivot. The locking member may include a catch to maintain the carrier frame over the means for mounting the article carrier to a conveyor when the carrier frame is disassociated from the means for mounting the article carrier to a conveyor. Also, the carrier frame may include at least one support surface allowing the carrier frame to rest on a weigh bridge when it is disassociated from the means for mounting the article carrier to a conveyor. The carrier frame may further include a roller, whereby the roller can be raised by disassembling the pivot and the carrier frame is shaped and dimensioned so that when the roller is raised to a certain extent, articles can be supported predominantly or solely by the rollers of two adjacent article carriers.

Preferably, the locking member is movable vertically by a direct force applied thereto.

Preferably, the locking member in use may interlock the carrier frame and means for mounting the article carrier to a conveyor through at least one projection engaging with at least one stop.

Preferably, the locking member may include at least one downwardly extending projection that engages with a stop provided on the means for mounting the article carrier to a conveyor and wherein the one or more projections move over the top of said stop when the locking member is moved to the second position.

Preferably, the locking member may be engaged with the carrier frame and move with the carrier frame about said pivot.

Preferably, in use, when the article carrier is in the carriage position, the locking member may tend to move into the first position due to gravity and is movable upwards to enter the second position.

According to a second aspect of the present invention, there is provided an article carrier including means for mounting the article carrier to a conveyor, a carrier frame located over said mounting means and freely movable about a pivot so as to be locatable in a carriage position, in which articles may be supported on the carrier frame, and an ejection position, in which articles are ejected from the carrier frame, and a movable locking member, wherein when the carrier frame is located in the carriage position, the vertical component of the weight of an article located on the carrier frame is borne by the carrier frame and means for mounting the article carrier to a conveyor, to the exclusion of the locking member and the locking member is locatable in a first position, in which movement of the carrier frame about said pivot is prevented and is locatable, by a direct force applied to the locking member, in a second position, in which the carrier frame can move about the pivot.

Preferably, the locking member may include at least one arm extending laterally of the pivot to which the direct linear force is applied to move the locking member from the first position to the second position.

In one embodiment, the carrier frame may be shaped and positioned relative to the means for mounting the article carrier to a conveyor so as to hold articles located thereon substantially centred vertically of the pivot when the carrier frame is in the carriage position.

In another embodiment, the carrier frame may be adapted to hold articles thereon so as to be centred in a plane horizontally offset of the pivot when the carrier frame is in the carriage position and wherein the carrier frame can pivot about said pivot in the direction of said article when the locking member is in the second position.

Preferably, the pivot may be able to the disassembled, whereby the carrier frame may be disassociated from the means for mounting the article carrier to a conveyor by removing the protrusion from the slot. The locking member may include a catch to maintain the carrier frame over the means for mounting the article carrier to a conveyor when the carrier frame is disassociated from the means for mounting the article carrier to a conveyor. The carrier frame may include at least one support surface allowing the carrier frame to rest on a weigh bridge when it is disassociated from the means for mounting the article carrier to a conveyor. Also, the carrier frame may include a roller, whereby the roller can be raised by disassembling the pivot and the carrier frame is shaped and dimensioned so that when the roller is raised to a certain extent, articles can be supported solely by the rollers of two adjacent article carriers.

Preferably, in use, when the article carrier is in the carriage position, the locking member may tend to move into the first position due to gravity and is movable upwards to enter the second position.

According to a third aspect of the present invention, there is provided an article carrier including a base portion engaged or engageable with a conveyor, a carrier portion removably pivotally engageable with the base portion, and a latch extending between the base portion and carrier portion that is pivotally and/or slidably engaged at a first end to the carrier portion and operable to interlock the carrier portion and base portion when in a first position and release the carrier portion and base portion when moved away from the first position, wherein in use, the latch includes a catch that, when the carrier portion is not pivotally engaged with the base portion, maintains the carrier portion over the base portion.

Preferably, the latch may be secured to the carrier portion and include one or more downwardly extending projections that engage with a stop provided on said base portion and wherein the one or more projections move over the top of said stop when the latch is moved to the second position.

Preferably, the carrier portion may include at least one support surface, allowing the carrier portion to rest on a weigh bridge when it is not pivotally engaged with the base portion.

Preferably, the carrier portion may include a roller, whereby the roller can be raised by disassembling the pivot and the carrier portion is shaped and dimensioned so that when the roller is raised to a certain extent, articles can be supported solely by the rollers of two adjacent article carriers.

According to a fourth aspect of the present invention, there is provided a grading apparatus for articles including an endless conveyor having a plurality of article carriers as defined in either claim 1 or claim 16 of the accompanying claims, the grading apparatus including a number of stations for receiving articles from said article carriers and including actuators located at each station and/or provided with each carrier and movable with each carrier, wherein each actuator is operable under the control of a controller to move the locking member from said first position to release the carrier frame from the means for mounting the article carrier to a conveyor.

According to a fifth aspect of the present invention, there is provided a grading apparatus for articles including an endless conveyor having a plurality of article carriers as defined in claim 25 of the accompanying claims, the grading apparatus including a number of stations for receiving articles from said article carriers and including actuators located at each station and/or provided with each carrier and movable with each carrier, wherein each actuator is operable under the control of a controller to move the latch from said first position to release the carrier portion from the base portion.

According to a sixth aspect of the present invention, there is provided a grading apparatus for articles including an endless conveyor having a plurality of article carriers as defined in claim 4 of the accompanying claims, the grading apparatus including a number of stations for receiving articles from said article carriers and including actuators located at each station and/or provided with each carrier and movable with each carrier, wherein each actuator is operable under the control of a controller to move the locking member upwards away from said first position until it abuts a stop, wherein the actuator is operable to provide an upwards motive force to said locking member after it has abutted said stop, thereby perturbing the carrier frame about the pivot.

According to a seventh aspect of the present invention, there is provided an article carrier substantially as herein described with reference to FIGS. 1 to 5, FIG. 6 or FIGS. 7 to 9 of accompanying drawings.

Further aspects of the present invention may become apparent from the following description, given by way of example only and with reference to the accompanying drawings.

BRIEF DESCRIPTION OF THE DRAWINGS

FIG. 7: shows a perspective view of a further alternative article carrier according to the present invention.

FIG. 8: shows a front view of the article carrier shown in FIG. 7.

FIG. 9: shows a partial cross-section through line GG in FIG. 8.

DETAILED DESCRIPTION OF THE DRAWINGS

Figure 1:
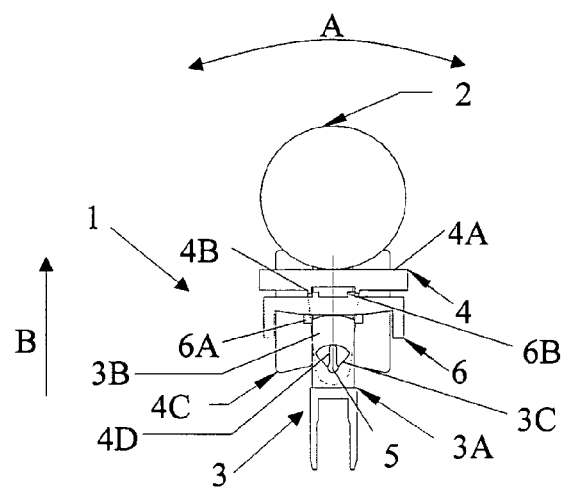
FIG. 1: shows simplified a front view of an article carrier according to an aspect of the present invention.

Throughout the following description, unless specifically indicated otherwise, like reference numerals refer to like components.

FIG. 1 shows a front view of an article carrier 1 according to a first embodiment of the present invention, with an article, in this case an item of fruit 2, located thereon. Some details of the article carrier 1 have been omitted from FIG. 1 for purposes of clarity of explanation.

The article carrier 1 includes a mounting means 3 for mounting to an endless conveyor (not shown). The mounting means 3 shown in FIG. 1 may be used to mount the article carrier to a chain linkage. However, those skilled in the relevant arts will appreciate that various other mounting means may be used, particularly where the endless conveyor is not a chain linkage. The article carrier 1 and endless conveyor may be used in an article grading system, similar to that described in the applicant's international publication number WO 94/14547, which is hereby incorporated herein in its entirety.

Figure 2:
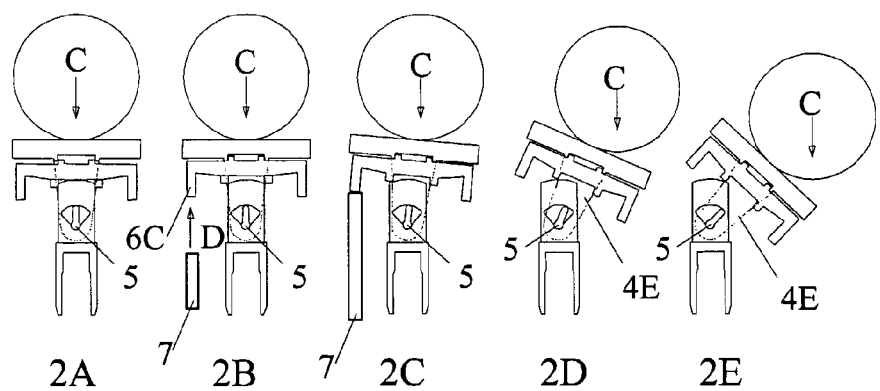
FIGS. 2A-E: show the tipping action of the article carrier shown in FIG. 1 from a carry position (FIG. 2A) to an ejection position (FIG. 2E).

The mounting means 3, which may be an integral component or assembled from a plurality of discrete components and may optionally be permanently engaged to a conveyor, may include a clip 3A for attachment to a chain of the endless conveyor and includes a stop 3B that extends upwards from the clip 3A. A carrier frame 4 is mounted to the mounting means 3 through a pivot 5. The carrier frame 4 can thus move about the pivot 5 as indicated by arrow A. The carrier frame 4 includes a support surface 4A on which the item of fruit 2 is supported and a column 4E (see FIG. 2) separating the support surface 4A from the pivot 5. In this embodiment, the carrier frame 4 also includes a roller 4C, which allows a rotational force to be applied to the item of fruit 2 (see herein below), which may be required, for example, to rotate the item of fruit 2 below an optical sensor. Other carrier frame structures that can support an article and move about a pivot provided in the mounting means may be used, with or without a roller.

The length of the column 4E is preferably the minimum possible in order to reduce the height at which item of fruit 2 is carried and therefore reduce any damage to the fruit that may otherwise occur during tipping of the carrier frame 4. The minimum length of the column 4E may be constrained by the diameter of the roller 4C and its location relative to the chain on which the article carrier 1 is mounted, as clearance is required to allow the carrier frame 4 to tip.

Figure 3:
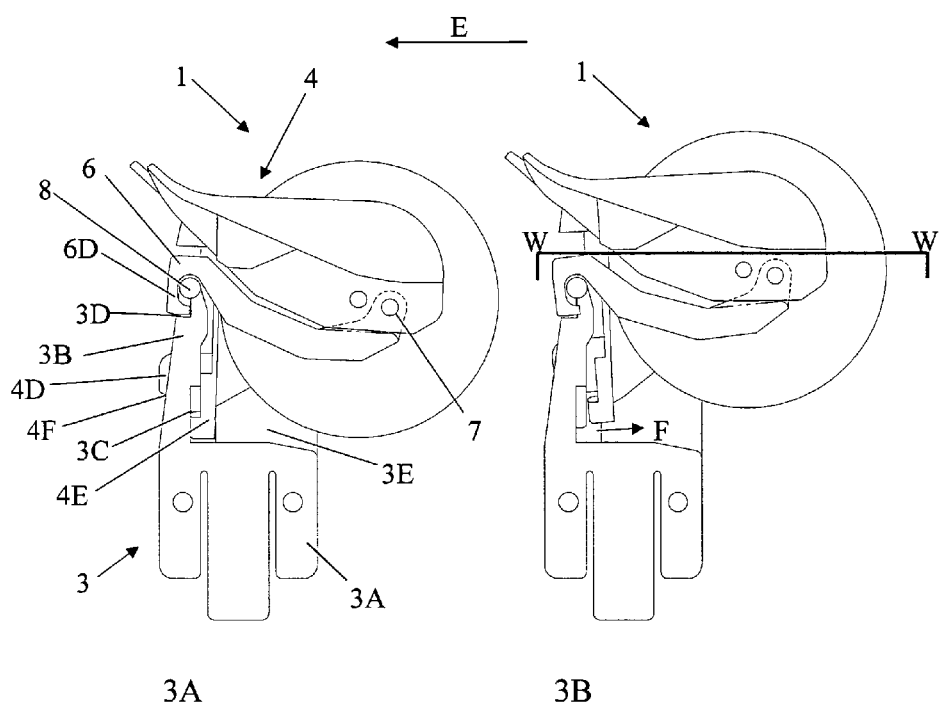
FIGS. 3A and 3B: show a side view of the article carrier shown in FIG. 1, with FIG. 3a showing the carrier in a carry position and FIG. 3B showing the article carrier in a weighing position.

A latch or locking member 6 is engaged to the carrier frame 4, or more preferably, as described in more detail herein below with reference to FIGS. 3A and 3B, is engaged between the carrier frame 4 and mounting means 3. In FIG. 1 the locking member 6 is in a first position so as to engage the carrier frame 4 with the stop 3B of the mounting means 3. The locking member 6 is moveable away from the first position upon application thereto of an appropriate motive force. The locking member 6 may thus be pivotally or slidably engaged with rest of the article carrier 1 to facilitate this movement from the first position.

The locking member 6 includes one or more projections for engaging with the mounting means 3 in an interlocking relationship. In the embodiment shown in FIG. 1, the locking member includes two projections 6A, which engage with the sides of the stop 3B when the carrier frame 4 and locking member 6 are in the first position. However, the locking member may include one or more than two projections, to enable the interlocking engagement. The locking member 6 is movable upwards away from the first position, as indicated by arrow B, so that the projections 6A disengage with the sides of the stop 3B, allowing the carrier frame 4 to move about the pivot 5, with the projections 6A passing over top of the stop 3B. The mounting means 3 may alternatively have projections that engage with recesses provided in the carrier frame 4.

The pivot 5 is formed by a projection 4D that is removably received by a slot 3C of the mounting means 3. The slot 3C may also act to limit the extent to which the carrier frame 4 can move about the pivot 5. Those skilled in the relevant arts will appreciate that movement of the carrier frame about the pivot 5 may be limited in other ways, in which case the projection 4D and slot 3C may both be annular.

Further projections 6B and 4B may be provided on the locking member 6 and carrier frame 4 respectively to guide the movement of the locking member 6.

FIGS. 2A-E show progressively the tipping action of the article carrier 1. In FIG. 2A, the article carrier 1 is in a carry position, which is the same position as shown in FIG. 1. The carrier frame 4 is preferably shaped so that the centre of gravity of the item of fruit 2 is located substantially vertically above the pivot 5. The centre of the carrier frame 4 may be located substantially vertically above the pivot 5 to assist in the location of the item of fruit in a required position. While it is preferred that the carrier frame 4 is shaped so as to always hold the item of fruit 2 in substantially the same position, some variation may occur.

Sideways movement of the carrier frame 4 is resisted by the projections 6A resting against the stop 3B. The location of the fruit 2 directly above the pivot point 5 reduces the frictional force between the projections 6A and stop 3B, as the location of the centre of gravity of the fruit, indicated by arrow C, directly above the pivot point minimises the turning moment applied about the pivot 5. This may reduce the required actuator power to move the locking member 6 over prior art tipping mechanisms where the locking member or mechanism bears at least some of the weight of the fruit 2. If the fruit centre of gravity is off-centre, the projections 6A prevent sideways shift of the carrier frame 4 and therefore the spontaneous tipping of carriers of the prior art may be avoided. The projections 6A and stop 3B may be located proximate a vertical line extending from the pivot 5 in order to reduce the frictional engagement of the locking member 6 with the mounting means 3 should the load on the carrier frame 4 be off-centre.

Referring to FIG. 2B, an actuator 7 may move up as indicated by arrow D so as to contact an arm 6C of the locking member 6 to move the locking member 6 away from the first position. This lifts the locking member 6 away from the first position to the position shown in FIG. 2B, also lifting the projections 6A above the stop 3B. The carrier frame 4 is then free to move about the pivot 5 and assuming that the load is centred on the pivot 5, the slightest perturbation will cause the carrier frame 4 to fall to one side. The actuator 7 may provide this perturbation by continuing to provide a motive force against the locking member 6 after it has reached the end of its movement away from the first position, abutting the carrier frame 4. If there is friction between the locking member 6 and carrier frame 4, the required perturbation may be provided prior to the locking member 6 completing its movement. However, in the preferred form of this embodiment, the friction will be minimised due to the locking member 6 not bearing any weight of an article on the carrier frame, due to the central location of the carrier frame 4 over the pivot 5 and the central location of the projections 6A.

As best illustrated in FIG. 2C, the actuator 7 also controls the direction of fall towards the opposite side due to acting to the side of the pivot 5. Where the load is centred on the side of the actuator 7, increased force is required to shift the centre of gravity to the opposite side of the pivot 5 in order to control the direction of fall. The fall continues through the position shown in FIG. 2D until the protrusion 4D contacts the edge of the slot 3C, ceasing the movement of the carrier frame 4 in an ejection position shown in FIG. 2E. The item of fruit 2 will be ejected from the article carrier 1 into a suitable receptacle (not shown).

Thus, the actuator 7 does not need to lift the item of fruit 2 or the carrier frame 4 and it does not need to move a locking member that is under load, all it needs to do is lift the locking member 6 and provide a perturbation to the carrier frame 4. This may reduce the required actuator power in comparison to carriers in which the actuator must lift the fruit or remove a pin or equivalent that is under the weight of the fruit. Also, improved reliability may result due to the carrier being stable when it is in the position shown in FIG. 2A, but unstable as soon as the locking member is moved away from its engagement position, allowing relatively small forces to result in the tipping action. Furthermore, the article carrier 1 and actuator 7 may be robust, relatively cheap to manufacture and relatively easy to install in comparison to many existing article carriers.

When the article carrier 1 is mounted to an endless conveyor, the carrier frame 4 will return to its position shown in FIG. 2A when the article carrier 1 is turned upside down. Suitable guides about the endless conveyor may be provided to maintain the carrier frame in this position while the endless conveyor returns the article carrier 1 to its vertical position, allowing the projections 6A to reengage with the stop 3B. The locking member 4 may be slightly biased downwards, although this is not essential.

The actuator 7 may be located in a position opposite a station where articles are to be ejected from the article carrier 1. Thus, the article carriers 1 may move on an endless conveyor past a series of actuators located on either side of the endless conveyor. A controller (not shown) may cause a particular actuator 7 to actuate and move into a position so that the locking member 6 of a selected article carrier 1 is pushed away from the first position when the article carrier 1 is next to it to eject the fruit at that station. Actuators 7 may be provided on both sides of the endless conveyor, allowing ejection of fruit to either side of the endless conveyor. Alternatively, actuators 7 may be provided on each article carrier 1 and move with the article carrier, whereby the control means actuates the required actuator when the article carrier 1 is located opposite a required ejection station. Although actuators may be provided both at fixed locations and on the article carriers 1, this would in most circumstances represent an unnecessary duplication.

Referring to FIGS. 3A and 3B, a side view of the article carrier 1 is shown. For clarity, the locking member 6 is shown in partial cutaway form to expose its connection to the carrier frame 4 and mounting means 3. The locking member 6 in this embodiment extends between the carrier frame 4 and mounting means 3 and prevents the carrier frame 4 from tipping backwards off the mounting means 3. In an alternative embodiment, the locking member 6 may be engaged at both ends to the carrier frame 4, with protrusions that extend down to engage with the mounting means 3 to lock the carrier frame 4 in position.

FIG. 3A shows the carrier 1 in a carry position for transporting any article located on the carrier along the endless conveyor to which the carrier 1 is attached. The carrier frame 4 is secured to the locking member 6 through a pivot 7 and the locking member 6 has a catch 6D that extends partially about a pivot 8 extending from the mounting means 3. The mounting means 3 includes a channel 3D below the pivot 8 to allow the catch 6D to travel past the mounting means 3 below the pivot 8 when the carrier frame 4 is moving about the pivot 5 when tipping.

In the carry position, the projection 4D extends through the slot 3C. In addition, the roller 4C rests on a support 3E. Therefore, the weight of any article on the carrier 4 is borne by the mounting means 3 through the roller 4C and column 4E and pivot point 3F (see FIG. 5), leaving no loading on the locking member 6.

FIG. 3B shows the article carrier 1 in a weighing position that enables a weighbridge W, the upper surface of which only is shown for clarity, to measure the weight of an article placed on the carrier frame 4. As the article carrier travels in the direction indicated by arrow E, it travels past a weighbridge, which extends past the periphery of the carrier frame 4 just above the locking member 6 so as to contact the carrier frame 4 and force it upwards into the position shown in FIG. 3B. The upwards and backwards movement caused by the weighbridge W causes the protrusion 4D to move out of the slot 3C as indicated by arrow F. When the article carrier 1 is in this position, the locking member 6 performs the additional function of keeping the carrier frame 4 in location over the mounting means 3, allowing the carrier frame 4 to return to the position shown in FIG. 3A once the weighbridge W is removed.

The item of fruit 2 may be rotated using a drive that contacts the lower edge of the roller 4C and the roller of a like article carrier immediately in front of the article carrier 1 and lifts the roller up past the position shown in FIG. 3B until the item of fruit is supported only by the roller 4C and the roller of the article carrier in front. The drive can then rotate both rollers in the same direction, causing the item of fruit to rotate. Again, the locking member 6 performs the function of retaining the carrier frame 4 over the mounting means 3.

Therefore, when the carrier frame 4 is in the position shown in FIG. 3B, apart from the locking member 6 acting as a pivotal linkage between the carrier frame 4 and mounting means 3, the carrier frame 4 is disassociated from the mounting means 3. This allows an accurate measure of the weight of an article on the carrier frame 4 to be measured, which would be the recorded weight less the weight of the carrier frame 4, which would be known in advance. Once weighing has been completed, the article carrier 1 continues moving in direction D off the weighbridge W, allowing the carrier frame 4 to return to the position shown in FIG. 3A, guided into place by the support 3E.

Often processing lines include an optical scanner to assist in grading. Having articles rotate beneath the optical scanner allows an increased surface area to be viewed from a single perspective. The article carrier 1 facilitates this rotation in combination with an adjacent article carrier. A v-belt (not shown) is provided at a level to contact the roller 4C and move it upwards. Like during the weighing operation, this causes the protrusion 4D to move out of the slot 3C. For rotation, the v-belt pushes the roller 4C further upwards than shown in FIG. 3B until the articles on the carrier frame 4 are supported only or predominantly only by two adjacent rollers 4C. The v-belt imparts a rotation to the rollers 4C, which rotate the fruit.

Fruit that is first loaded onto the rollers, particularly misshapen fruit, may be unstable and require additional support. This may be achieved by guiding the fruit past a soft brush material (not shown) that is located so as to maintain the fruit on the rollers. The soft brush material may be located to either side of the conveyor and may be angled downwards and inwards, so as to form a partial "V" shape centred on the conveyor. The brush material may extend along the conveyor in the region where the rollers are raised for a length of approximately 1-2 metres.

Figure 4:
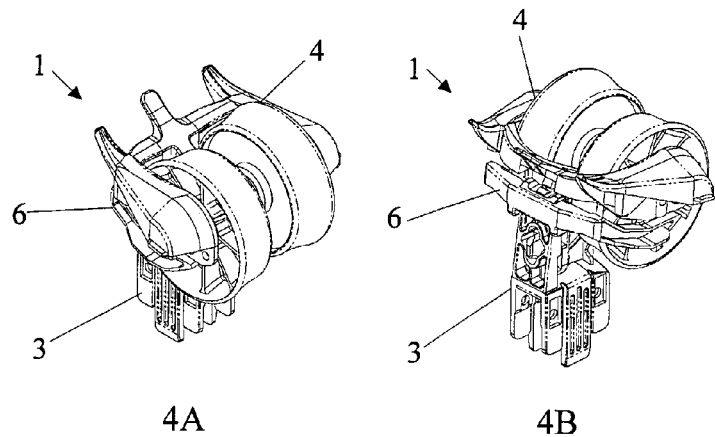
FIGS. 4A and 4B: show respectively a detailed perspective rear view and perspective front view of the article carrier of FIG. 1 without an article located thereon.

FIG. 4A shows a front perspective view and FIG. 4B shows a rear perspective view of the article carrier 1, including further details. The mounting means 3, carrier frame 4 and locking member 6 are shown in FIGS. 4A and 4B.

Figure 5:
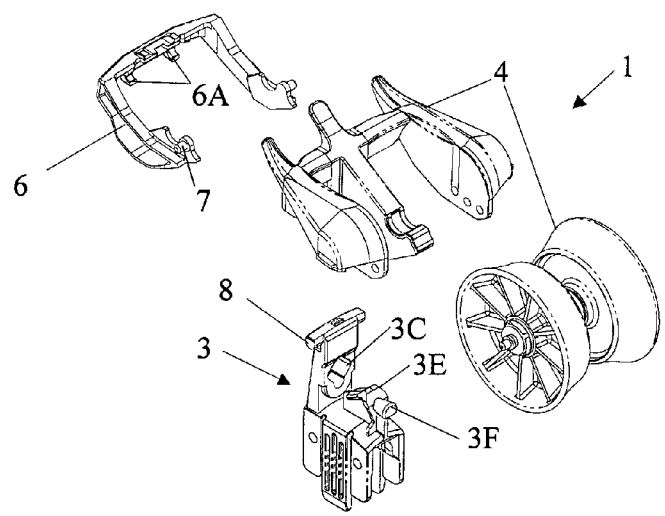
FIG. 5: shows an exploded view of the article carrier of FIGS. 3A and 3B.

FIG. 5 shows an exploded view of the article carrier 1. The article carrier 1 may be supplied in kitset form with the separate components shown in FIG. 4.

In an alternative embodiment, the locking member 6 fixedly engaged with the mounting means 3 so that it remains in position when the carrier frame 4 tips to either side. In this embodiment the actuator may cause the latch to move downwards to disengage the carrier frame 4 from the mounting means 3 and allowing the carrier frame 4 to move about the pivot 5. This embodiment may be less preferred, due to requiring a more complex actuator arrangement.

Those skilled in the relevant arts will appreciate that the stop 3B, carrier frame 4 and locking member 6 may have various shapes and configurations that are still operable to cause the locking member to maintain the carrier frame in a fixed position relative to the mounting means when it is in a first position and allow the carrier frame to move about a pivot when the locking member is moved away from the first position. The actuator used with the present invention may also be varied depending on the shape and configuration used for the stop, carrier frame and locking member.

Figure 6:
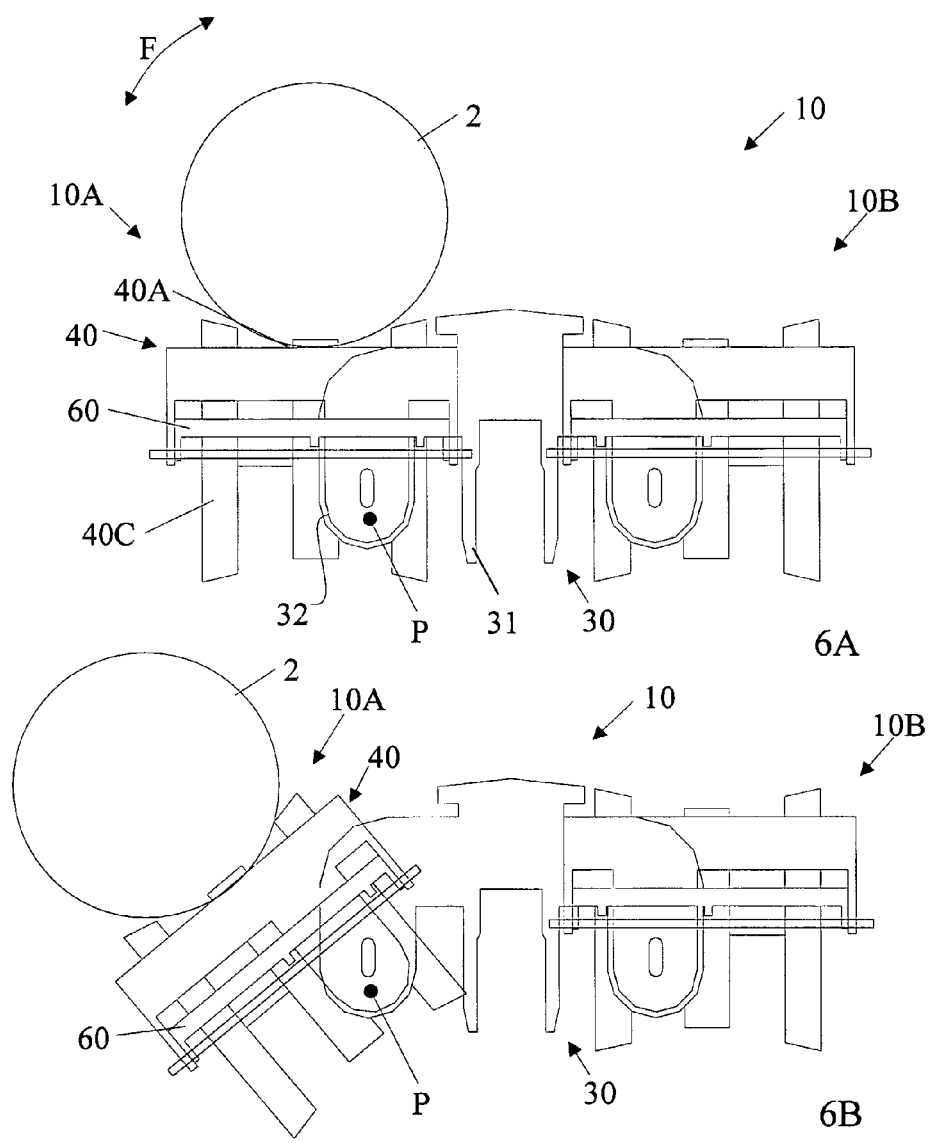
FIGS. 6A and 6B: show an end view of an alternative article carrier according to the present invention.

FIGS. 6A and 6B show a front view of an article carrier 10 according to a second embodiment of the present invention. Some details of the article carrier 10 have been omitted from FIGS. 6A and 6B for purposes of clarity of explanation. The article carrier 10 actually includes two article carriers 10A and 10B, which in use operate to eject fruit to opposing sides of the article carrier 10.

The article carrier 10 includes a single mounting means 30 for mounting to an endless conveyor (not shown), which may be a chain linkage. The mounting means 30, which may be an integral component or assembled from a plurality of discrete components, may include a clip 31 for attachment to a chain of the endless conveyor. For clarity, the following description refers solely to article carrier 10A, with article carrier 10B being a mirror image of article carrier 10A.

A carrier frame 40 is mounted to the mounting means 30 through a pivot (obscured). The location of the pivot is indicated by P in FIGS. 6A and 6B. The carrier frame 40 can thus move about its pivot as indicated by arrow F. Unlike the carrier frame 4 of the article carrier 1 shown in FIG. 1, the carrier frame 40 can only pivot in one direction and therefore only eject fruit to one side of the article carrier 10. The carrier frame 40 includes a support surface 40A on which the item of fruit 2 is supported and a column 40E (obscured) separating the support surface 4A from the pivot. The carrier frame 40 also includes a roller 40C, forming part of the support surface 40A, which allows a rotational force to be applied to the item of fruit 2 in the same way as roller 4C of article carrier 1. Other carrier frame structures that can support an article and move about a pivot provided in the mounting means may be used, with or without a roller.

A locking member 60 is engaged between the carrier frame 40 and mounting means 30. The locking member 60 includes projections 61 and 62 that engage with the stop 32 to hold the article carrier 10A in the position shown in FIG. 6A. The locking member 60 is moveable upwards upon application thereto of an appropriate motive force, disengaging the projections 61, 62 from the stop 32 and allowing the carrier frame 40 to move about its pivot. The locking member 60 may thus be pivotally or slidably engaged with rest of the article carrier 10A to facilitate this upwards movement. Projection 61 may be omitted if the carrier frame 40 is prevented from pivoting to the right by another stop.

The article carrier 10A positions the fruit outside of the location of the pivot and is therefore inherently instable. Therefore, as soon as the locking member 60 is raised sufficiently for the projections 61 and 62 to clear the stop 32, the carrier frame 40 moves to the position shown in FIG. 6B and the fruit 2 is ejected. The movement of the carrier frame 40 may be stopped by the roller 40C contacting the mounting means 30 or by any other suitable method.

An advantage of the article carrier 10A over the article carrier 1 is that largely misshapen fruit will not result in the carrier frame 40 tending to pivot to the right. Therefore, there is no need to provide a perturbation force in the required ejection direction. However, for the same reason the projection 62 will always be forced against the stop 32, which may increase the actuator power required to lift the locking member 60. However, this force is minimised due to the small surface area of contact between the locking member 60 and carrier frame 40. Reducing the force required to lift the locking member 60 needs to be traded off against the chance of the locking member being inadvertently raised, perhaps due to vibration from the movement of the conveying means.

The article carrier 10A may have a pivot and other details the same as or similar to the article carrier 1, allowing fruit 2 to be supported between rollers of adjacent article carriers and allowing weighing of the fruit if required. If optical scanning is required, the article carriers 10A and 10B may be offset, allowing an optical scanner to view the side of an article on an article carrier 10A through the gap between two article carriers 10B and vice-versa.

FIG. 7 shows a perspective view of a further alternative article carrier 100 according to the present invention. The article carrier 100, like article carrier 1 can tip in either direction and a carrier frame 400, located over a mounting means 300, is centred over a pivot 500. A locking member 600 is slidably engaged with the carrier frame 400 and extends between the carrier frame 400 and mounting means 300 to maintain the carrier frame 400 in its carriage position shown in FIG. 7. This is achieved by vertically extending protrusions and a stop (not shown) provided on the locking member 600 and mounting means 300. To release the carrier frame 400 from the mounting means 300, the locking member 600 is moved upwards. Unlike the locking member 6 of article carrier 1, the locking member 600 does not extend backwards to a pivot point located towards the rear of the carrier frame. Instead, the locking member is localised to the front of the article carrier 100.

FIG. 8 shows a front view of the article carrier 100 and FIG. 9 shows a cross section through line GG in FIG. 8. The locking member 600 includes a catch 601 that is in the shape of an inverted "L", in contrast to the "U" shape catch of locking member 6. A cavity 301 is provided in the mounting means 300 to provide clearance for the catch 601 when the carrier frame 400 is lifted in the same way that article carrier 1 may be lifted for weighing purposes (see FIG. 3B) or lifted to allow rotation of the article on the article carrier 100.

If weighing and rotation of the article on the article carriers 1, 10, 100 is not required, those skilled in the relevant arts will appreciate that the carrier frame does not need to become disassociated from the mounting means. Therefore, the pivot between the carrier frame and mounting means does not need to come apart and the locking member does not need to have a catch to hold the carrier frame over the mounting means. However, to provide increased functionality, the preferred embodiment of the article carrier of the present invention allows at least one of weighing and rotation of the articles.

In a further alternative embodiment, the locking member 600 may be slidably and/or pivotally engaged with the mounting means 300, biased upwards, and inverted so that downward movement of the locking member releases the carrier frame 400. However, this represents a less preferred embodiment, due to the increased complexity of the carrier resulting from having to bias the locking member and the more complex actuator arrangement required to move a locking member downwards instead of upwards.

The components of the article carriers 1, 10, 100 may be constructed using a plastic injection moulding process. The material may, for example, be 30% glass reinforced nylon, although other suitable materials will be apparent to those skilled in the relevant arts.

Figure 10:
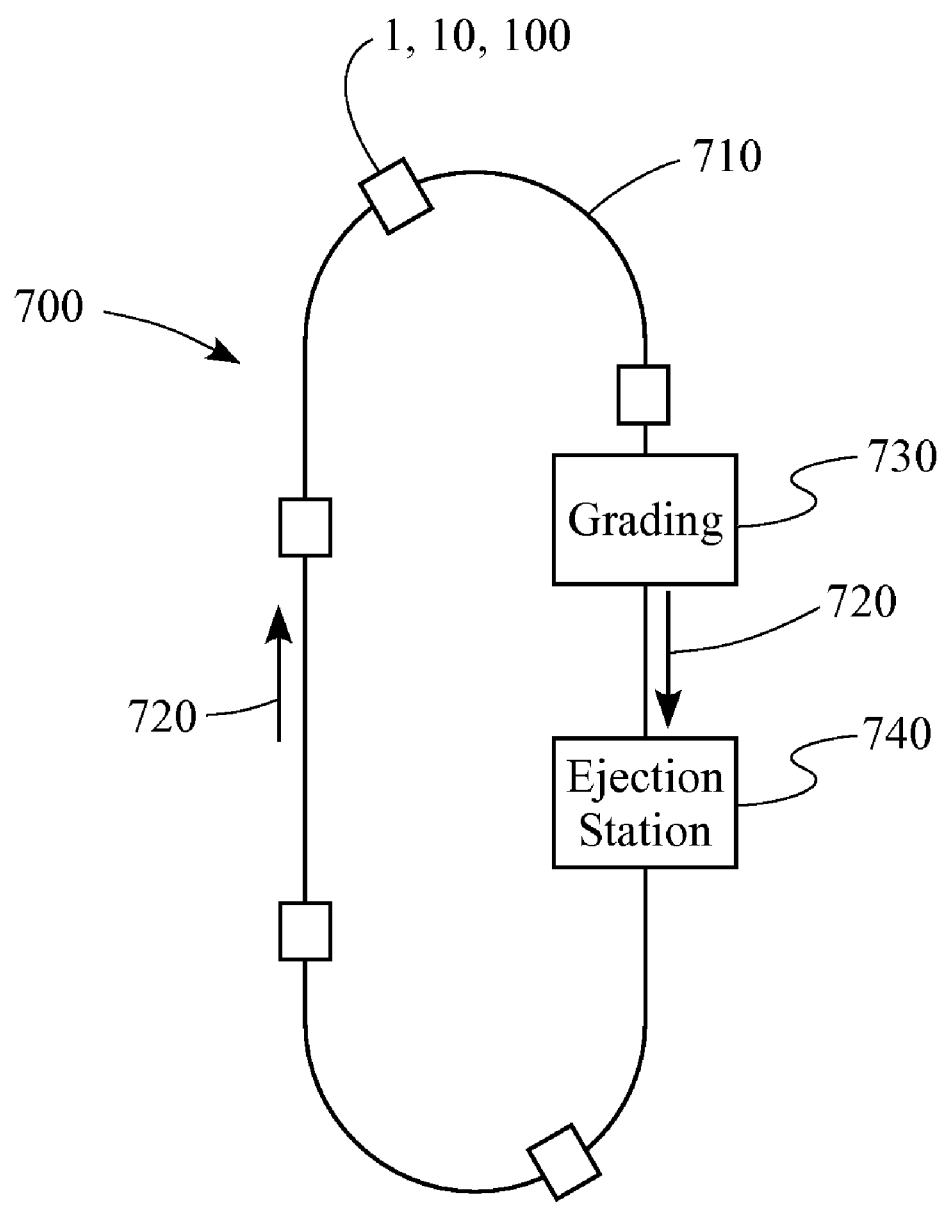
FIG. 10: is a schematic diagram of an article-grading apparatus according to an embodiment of the present invention.

FIG. 10 is a schematic diagram of an embodiment of an article grading apparatus 700 in which the article carriers 1, 10, 100 may be used. The article grading apparatus 700 includes an endless conveyor 710 to which the article carriers 1, 10, 100 are mounted. The conveyor 710 runs in the direction indicated by the arrows 720. The conveyor 710 moves the article carriers 1, 10, and 100, and any articles carried thereon, through an article grading means 730 such as a weighbridge or an optical scanner. The conveyor 710 then moves the article carriers 1, 10, and 100, and any articles carried thereon, through an ejection station 740, where actuators actuate the article carriers to discharge their contents, as hereinabove explained.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The claims defining the invention are as follows:

1. An article carrier including:
   a) means for mounting the article carrier to a conveyor;
   b) a carrier frame associated with said means for mounting the article carrier to a conveyor and freely movable about a pivot so as to be locatable in a carriage position, in which articles may be supported on the carrier frame, and an ejection position, in which articles are ejected from the carrier frame; and
   c) a locking member;
   wherein when the carrier frame is located in the carriage position, the locking member is locatable in a first position that prevents movement of the carrier frame about said pivot and is movable relative to both the carrier frame and the mounting means into a second position that releases the carrier frame, allowing the carrier frame to move about the pivot, and wherein when the locking member is located in the first position to prevent movement of the carrier frame, the locking member is not under load.

2. The article carrier of claim 1, wherein the carrier frame is shaped and positioned relative to the means for mounting the article carrier to a conveyor so as to hold articles located thereon substantially centered vertically of the pivot when the carrier frame is in the carriage position.

3. The article carrier of claim 1, wherein when an article is located on said carrier frame when the carrier frame is in the carriage position, substantially no weight of the article is borne by the locking member.

4. The article carrier of claim 1, wherein the locking member is secured to the carrier frame so as to move with the carrier frame about the pivot and includes a portion that extends to both sides of the pivot, whereby at least after the completion of a vertical movement of the locking member from the first position to the second position, motive force applied to the locking member in the direction of the second position acts to cause the carrier frame to move about the pivot.

5. The article carrier of claim 1, wherein the locking member includes at least one arm extending laterally of the pivot to which the direct linear force is applied to move the locking member from the first position to the second position.

6. The article carrier of claim 1, wherein the carrier frame is adapted to hold articles thereon so as to be centered in a plane horizontally offset of the pivot when the carrier frame is in the carriage position and wherein the carrier frame can pivot about said pivot in the direction of said article when the locking member is in the second position.

7. The article carrier of claim 1, wherein the pivot may be disassembled, and wherein the locking member includes a catch that, when the pivot is disassembled, maintains the carrier frame in association with the mounting means.

8. The article carrier of claim 1, wherein the locking member is secured to the carrier frame and includes one or more downwardly extending projections that engage with a stop provided on the mounting means and wherein the one or more projections move over the top of said stop when the locking member is moved to the second position.

9. The article carrier of claim 1, wherein the carrier frame includes a roller, whereby the roller can be raised by disassembling the pivot, and wherein the carrier frame is shaped and dimensioned so that when the roller is raised to a predetermined height, articles can be supported solely by the rollers of two adjacent article carriers.

10. The article carrier of claim 1, wherein the locking member is movable vertically by a direct force applied thereto.

11. The article carrier of claim 1, wherein the locking member in use interlocks the carrier frame and means for mounting the article carrier to a conveyor through at least one projection engaging with at least one stop.

12. The article carrier of claim 1, wherein the locking member includes at least one downwardly extending projection that engages with a stop provided on the means for mounting the article carrier to a conveyor and wherein the at least one downwardly extending projection move over the top of said stop when the locking member is moved to the second position.

13. The article carrier of claim 1, wherein the locking member is engaged with the carrier frame and moves with the carrier frame about said pivot.

14. The article carrier of claim 1, wherein in use, when the article carrier is in the carriage position, the locking member tends to move into the first position due to gravity and is movable upwards to enter the second position.

15. An article carrier including:
   a) means for mounting the article carrier to a conveyor;
   b) a carrier frame located over said mounting means and freely movable about a pivot so as to be locatable in a carriage position, in which articles may be supported on the carrier frame, and an ejection position, in which articles are ejected from the carrier frame; and
   c) a movable locking member;
   wherein when the carrier frame is located in the carriage position, the vertical component of the weight of an article located on the carrier frame is borne by the carrier frame and means for mounting the article carrier to a conveyor, to the exclusion of the locking member and the locking member is locatable in a first position, in which movement of the carrier frame about said pivot is prevented and is locatable, by a direct force applied to the locking member, in a second position, in which the carrier frame can move about the pivot; and
   wherein in use, when the article carrier is in the carriage position, the locking member tends to move into the first position due to gravity and is movable upwards to enter the second position.

16. The article carrier of claim 15, wherein the locking member includes at least one arm extending laterally of the pivot to which the direct linear force is applied to move the locking member from the first position to the second position.

17. The article carrier of claim 15, wherein the carrier frame is shaped and positioned relative to the means for mounting the article carrier to a conveyor so as to hold articles located thereon substantially centered vertically of the pivot when the carrier frame is in the carriage position.

18. The article carrier of claim 15, wherein the carrier frame is adapted to hold articles thereon so as to be centered in a plane horizontally offset of the pivot when the carrier frame is in the carriage position and wherein the carrier frame can pivot about said pivot in the direction of said article when the locking member is in the second position.

19. The article carrier of claim 15, wherein the pivot comprises a protrusion extending into a slot and is able to the be disassembled, whereby the carrier frame may be disassociated from the means for mounting the article carrier to a conveyor by removing the protrusion from the slot.

20. The article carrier of claim 19, wherein the locking member includes a catch to maintain the carrier frame over the means for mounting the article carrier to a conveyor when the carrier frame is disassociated from the means for mounting the article carrier to a conveyor.

21. The article carrier of claim 19, wherein the carrier frame includes at least one support surface allowing the carrier frame to rest on a weigh bridge when it is disassociated from the means for mounting the article carrier to a conveyor.

22. The article carrier of claim 19, wherein the carrier frame includes a roller, whereby the roller can be raised by disassembling the pivot and the carrier frame is shaped and dimensioned so that when the roller is raised to a certain extent, articles can be supported solely by the rollers of two adjacent article carriers.

23. An article carrier including:
   a) a base portion one of engaged and engageable with a conveyor;
   b) a carrier portion removably pivotally engageable with the base portion;
   c) a latch extending between the base portion and carrier portion that is at least one of pivotally and slidably engaged at a first end to the carrier portion and operable to interlock the carrier portion and base portion when in a first position and release the carrier portion and base portion when moved away from the first position;
   wherein the latch is secured to the carrier portion and includes at least one downwardly extending projection that engages with a stop provided on said base portion and wherein the at least one downwardly extending projection moves over the top of said stop when the latch is moved to the second position; and
   wherein in use, the latch includes a catch that, when the carrier portion is not pivotally engaged with the base portion, maintains the carrier portion over the base portion.

24. The article carrier of claim 23, wherein the carrier portion includes at least one support surface, allowing the carrier portion to rest on a weigh bridge when it is not pivotally engaged with the base portion.

25. The article carrier of claim 23, wherein the carrier portion includes a roller, whereby the roller can be raised by disassembling the pivot and the carrier portion is shaped and dimensioned so that when the roller is raised to a certain extent, articles can be supported solely by the rollers of two adjacent article carriers.

26. A conveyor system comprising:
   an endless conveyor;
   a plurality of article carriers as claimed in claim 1 mounted to said conveyor;
   a station disposed at a location along said conveyor for receiving articles from said article carriers; and
   an actuator operable under the control of a controller when an article carrier is located at said station to move the locking member from said first position to release the carrier frame from the means for mounting the article carrier to a conveyor.

27. A conveyor system, comprising:
   an endless conveyor;
   a plurality of article carriers as claimed claim 23 engaged with said conveyor;
   a station disposed at a location along said conveyor for receiving articles from said article carriers; and
   an actuator operable under the control of a controller when an article carrier is at said station to move the latch from said first position to release the carrier portion from the base portion.

28. A conveyor system, comprising:
   an endless conveyor;

a plurality of article carriers as claimed in claim 4 mounted to said conveyor;

a station disposed at a location along said conveyor for receiving articles from said article carriers; and an actuator operable under the control of a controller when an article carrier is located at said station to move the locking member upwards away from said first position until it abuts a stop, wherein the actuator is operable to provide an upwards motive force to said locking member after it has abutted said stop, thereby perturbing the carrier frame about the pivot.

29. A conveyor system, comprising:

an endless conveyor;

a plurality of article carriers as claimed in claim 15 mounted to said conveyor;

a station disposed at a location along said conveyor for receiving articles from said article carriers; and an actuator operable under the control of a controller when an article carrier is located at said station to move the locking member from said first position to release the carrier frame from the means for mounting the article carrier to a conveyor.

30. An article carrier comprising:

a) means for mounting the article carrier to a conveyor;

b) a carrier frame associated with said means for mounting the article carrier to a conveyor and freely movable about a pivot so as to be locatable in a carriage position, in which articles may be supported on the carrier frame, and an ejection position, in which articles are ejected from the carrier frame, wherein the carrier frame is shaped and positioned relative to the means for mounting the article carrier to a conveyor so that when the carrier frame is in the carriage position, articles are located thereon substantially centered vertically of the pivot when the carrier frame is in the carriage position; and c) a locking member;

wherein when the carrier frame is located in the carriage position, the locking member is locatable in a first position that prevents movement of the carrier frame about said pivot and is movable into a second position that releases the carrier frame, allowing the carrier frame to move about the pivot and wherein the carrier frame includes at least one support surface allowing the carrier frame to rest on a means for weighing when it is disassociated from the means for mounting the article carrier to a conveyor, thereby allowing the means for weighing to weigh the carrier frame with an item located thereon.

31. The article carrier of claim 30, wherein the locking member travels vertically in order to move from the first position to the second position.

32. The article carrier of claim 30, wherein the article carrier is substantially symmetrical about a vertical plane through said pivot.

33. The article carrier of claim 30, wherein the carrier frame is dissociable from the means for mounting the article carrier to a conveyor by disassembling the pivot.

34. The article carrier of claim 33, wherein the pivot comprises a protrusion extending into a slot and disassembling the pivot involves removing the protrusion from the slot.

35. The article carrier of claim 30, wherein the locking member includes a catch to maintain the relative position of the carrier frame to the means for mounting the article carrier to a conveyor when the carrier frame is disassociated from the means for mounting the article carrier to a conveyor.

36. An article carrier comprising:

a) means for mounting the article carrier to a conveyor;

b) a first carrier frame located to one side of said means for mounting the article carrier to a conveyor and a second carrier frame located to the opposing side of said means for mounting the article carrier to a conveyor, wherein both the first and second carrier frames are freely movable about a pivot so as to be locatable in a carriage position, in which articles may be supported on the carrier frame, and an ejection position, in which articles are ejected from the carrier frame in a direction away from the means for mounting the article carrier to a conveyor; and c) first and second locking members for the first carrier frame and second carrier frame respectively;

wherein when the first and second carrier frames are located in the carriage position, the first and second locking members are each locatable in a first position that prevents movement of the carrier frame about said pivot and is movable into a second position that releases the carrier frame, whereby the carrier frame moves under the force of gravity about the pivot to the ejection position.

37. The article carrier of claim 36, wherein the first and second locking members travel vertically in order to move from the first position to the second position.

38. The article carrier of claim 36, wherein the first and second locking members are movable between their respective first and second positions independently of each other so the first and second carrier frames are movable from the carnage position to the ejection position independently of each other.

39. The article carrier of claim 36, wherein the first and second locking members are secured to the first and second carrier frames respectively so as to move with the carrier frame about the pivot.

40. The article carrier of claim 36, wherein each carrier frame is dissociable from the means for mounting the article carrier to a conveyor by disassembling said pivot.

41. The article carrier of claim 40, wherein the locking member includes a catch to maintain the carrier frame in position relative to the means for mounting the article carrier to a conveyor when the carrier frame is disassociated from the means for mounting the article carrier to a conveyor.

42. The article carrier of claim 40, wherein each carrier frame includes at least one support surface allowing the carrier frame to rest on a means for weighing when the carrier frame is disassociated from the means for mounting the article carrier to a conveyor, thereby allowing the means for weighing to weigh the carrier frame with an item located thereon.

43. The article carrier of claim 40, wherein each carrier frame includes a roller, whereby the roller can be raised by disassembling the pivot and the carrier frame is shaped and dimensioned so that when the roller is raised to a certain extent, articles can be supported predominantly or solely by the rollers of two adjacent article carriers.

44. The article carrier of claim 36, wherein the locking member is movable vertically by a direct force applied thereto.

45. The article carrier of claim 36, wherein each locking member in use interlocks its respective carrier frame and means for mounting the article carrier to a conveyor through at least one projection engaging with at least one stop.

46. The article carrier of claim 36, wherein each locking member includes at least one downwardly extending projection that engages with a stop provided on the means for mounting the article carrier to a conveyor and wherein the one or more projections move over the top of said stop when the locking member is moved to the second position.

47. The article carrier of claim 36, wherein each locking member is engaged with its respective carrier frame and moves with the carrier frame about said pivot.

48. The article carrier of claim 36, wherein in use, when each carrier frame is in the carriage position, the respective locking member tends to move into the first position due to gravity and is movable upwards to enter the second position.

49. The article carrier of claim 36, wherein the first and second carrier frames are both located in a plane transverse to the direction of travel of the article carrier when in use.

50. An article carrier including:
  a) means for mounting the article carrier to a conveyor;
  b) a carrier frame associated with said means for mounting the article carrier to a conveyor and movable about a pivot so as to be locatable in a carriage position, in which articles maybe supported on the carrier frame, and an ejection position, in which articles are ejected from the carrier frame; and
  c) a movable control member that selectively prevents or allows movement of the carrier frame about said pivot;
  wherein the carrier frame is dissociable from the means for mounting the article carrier to a conveyor by conveying the article carrier past one or more upwardly facing surfaces of a means for weighing, located to abut one or more downwardly facing surfaces on the carrier frame.

51. The article carrier of claim 50, wherein when the article carrier is in the carriage position and the carrier frame is associated with the means for mounting the article carrier to a conveyor, said one or more downwardly facing surfaces on the carrier frame also has a component facing the direction in which the article carrier is conveyed.

52. The article carrier of claim 51, wherein when the carrier frame is passed over said one or more upwardly facing surfaces of a means for weighing, the carrier frame is tilted, thereby disassembling the pivot.

53. The article carrier of claim 50, wherein the carrier frame automatically associates with the means for mounting the article carrier to a conveyor when the one or more downwardly facing surfaces on the carrier frame no longer abuts the one or more upwardly facing surfaces of a means for weighing.

54. A conveyor system, comprising:
  an endless conveyor;
  a plurality of article carriers mounted to said conveyor, each of said article carriers including:
    a) means for mounting the article carrier to said conveyor;
    b) a carrier frame associated with said means for mounting the article carrier to said conveyor and freely movable about a pivot so as to be locatable in a carriage position, in which articles may be supported on the carrier frame, and an ejection position, in which articles are ejected from the carrier frame;
    c) a locking member, wherein when the carrier frame is located in the carriage position, the locking member is locatable in a first position that prevents movement of the carrier frame about said pivot and is movable relative to both the carrier frame and the mounting means into a second position that releases the carrier frame, allowing the carrier frame to move about the pivot, and wherein when the locking member is located in the first position to prevent movement of the carrier frame, the locking member is not under load; and
  an ejection station disposed at a location along said conveyor for receiving articles from the article carriers; and
  an actuator operable at the ejection station under the control of a controller to move the locking member from the first position to release the carrier frame from the means for mounting the article carrier to a conveyor.

55. A grading apparatus for articles, comprising:
  an endless conveyor;
  a plurality of article carriers mounted to said conveyor, each of said article carriers including:
    a) means for mounting the article carrier to said conveyor;
    b) a carrier frame associated with said means for mounting the article carrier to said conveyor and freely movable about a pivot so as to be locatable in a carriage position, in which articles may be supported on the carrier frame, and an ejection position, in which articles are ejected from the carrier frame;
    c) a locking member, wherein when the carrier frame is located in the carriage position, the locking member is locatable in a first position that prevents movement of the carrier frame about said pivot and is movable relative to both the carrier frame and the mounting means into a second position that releases the carrier frame, allowing the carrier frame to move about the pivot, and wherein when the locking member is located in the first position to prevent movement of the carrier frame, the locking member is not under load; and
  an ejection station disposed at a location along said conveyor for receiving articles from the article carriers;
  an actuator operable at the station under the control of a controller to move the locking member from the first position to release the carrier frame from the means for mounting the article carrier to a conveyor; and
  means located along said conveyor for grading an article carried on one of said plurality of article carriers.

* * * * *